Aug. 16, 1955  W. G. CLAYTON  2,715,358
SLIDE LOCKING DEVICE FOR PHOTOGRAPHIC FILM HOLDERS
Filed Dec. 26, 1950
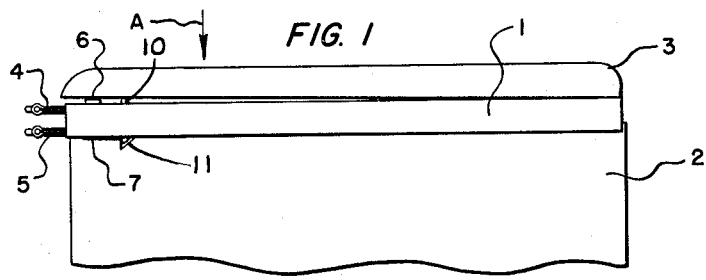
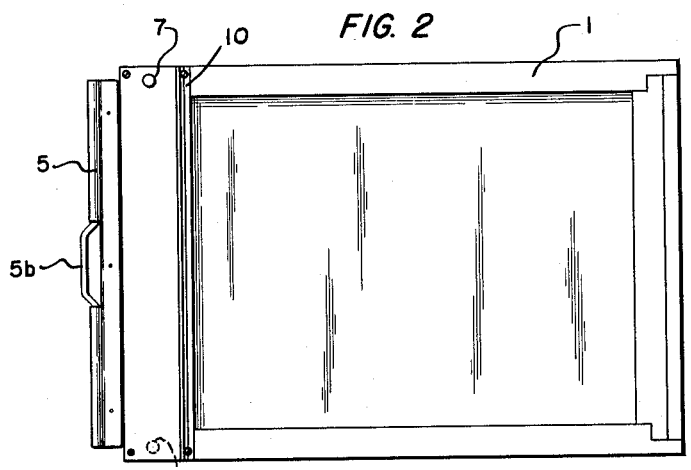
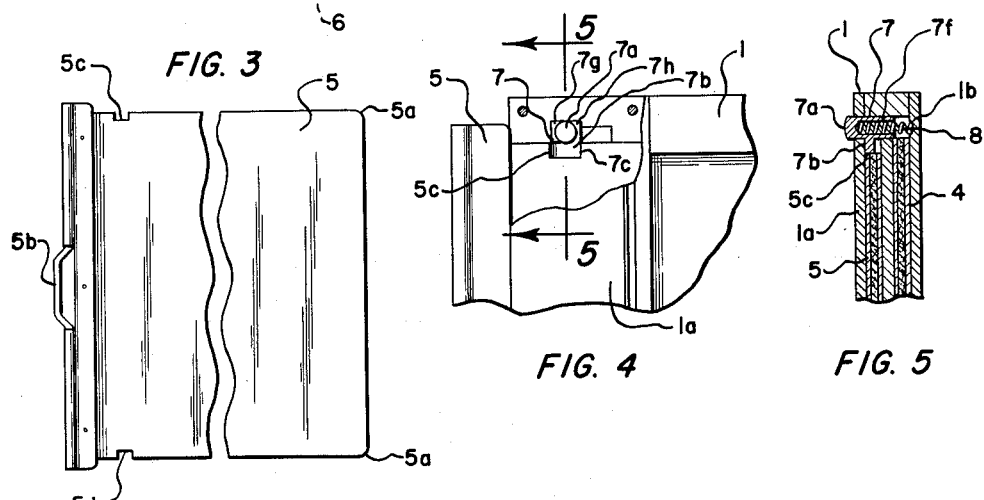
INVENTOR.
WILLIAM G. CLAYTON
BY
Wm. H. Dean
AGENT

United States Patent Office 2,715,358
Patented Aug. 16, 1955

2,715,358

SLIDE LOCKING DEVICE FOR PHOTOGRAPHIC FILM HOLDERS

William G. Clayton, Oceanside, Calif., assignor to General Aniline & Film Corporation, New York, N. Y., a corporation of Delaware Application December 26, 1950, Serial No. 202,760

2 Claims. (Cl. 95—71)

My invention relates to a slide locking device for photographic film holders, and the objects of my invention are:

First, to provide a slide locking device for photographic film holders of this class which automatically releases the slides in the film holder when the film holder is placed in a press or view camera having a spring loaded back plate.

Second, to provide a slide locking device for photographic film holders of this class in which the slide locking means is automatically released by pressure of the back plate of the camera when the film holder is placed therein;

Third, to provide a device of this class which greatly facilitates operations in a dark room, in that a small button is provided on the photographic film holder which may be manually operated for releasing the slides, in order to remove the film or plates;

Fourth, to provide a device of this class which insures the safety of film and greatly facilitates the operation of the slides in connection with the film holder;

Fifth, to provide a device of this class which automatically locks the slide in the film holder when the slide is placed therein;

Sixth, to provide a device of this class which greatly speeds up the operation of handling the slides of conventional photographic film holders;

Seventh, to provide a device of this class which is permanently attached to the film holder and which does not readily or easily become loosened and lost;

Eighth, to provide a device of this class which requires no attention whatsoever when removing a slide from a film holder held in the camera; and Ninth, to provide a device of this class which is very simple and ecomonical of construction, efficient in operation, and which will not readily deteriorate or get out of order.

With these and other objects in view, as will appear hereinafter, my invention consists of certain novel features of construction, combination and arrangement of parts, as will be hereinafter described in detail and particularly set forth in the appended claims, reference being had to the accompanying drawings in which:

Fig. 1 is a side view of a conventional photographic film holder modified in accordance with my invention and illustrating by solid lines the relationship of this holder to a type of camera having a spring-loaded back plate; Fig. 2 is a top view of the photographic film holder, showing my slide locking device in connection therewith; Fig. 3 is a top view of the conventional slide modified to coact with my slide locking device when placed in a photographic film holder, showing portions of the slide broken away to facilitate the illustration; Fig. 4 is an enlarged fragmentary top view of a photographic film holder, showing my slide locking device in connection therewith, portions of the film holder being broken away to amplify the illustration; Fig. 5 is a fragmentary sectional view, taken along the line 5—5 of Fig. 4; Fig. 6 is a side elevational view of the locking button of my slide locking device; and Fig. 7 is a sectional view, taken along the line 7—7 of Fig. 6.

Identical characters of reference designate similar component parts throughout the several views of the drawings with letter indices as to their structural features.

The film holder 1 may be used for either film or plates, as desired. The slides 4 and 5 are conventional in construction except that as shown in Fig. 3 of the drawings, the slide 5 is provided with rounded corners 5a, at the opposite end thereof from the handle 5b, and opposite edges of the slide 5 are provided with notch or detent portions 5c and 5d, which are in close proximity to the handle end. The locking buttons 6 and 7 are located in the frame of the holder and are adapted to engage the notch or detent portions of the slides. For example, the notch portions 5c and 5d, as shown in Fig. 3 of the drawings.

The locking buttons 6 and 7 are similar in construction. The locking button 7 is provided with a projecting manually engageable button portion 7a, integral with which is a shelf or shoulder portion 7b, as shown best in Figs. 5 and 6 of the drawings. This portion 7b is engaged at the inner side of the frame plate 1a of the film holder 1, retaining the portion 7b of said button 7 in interfering alignment with the slide 5, as shown best in Fig. 5 of the drawings. The end 7c of the shelf portion 7b engages the notch 5c of the slide 5, preventing accidental removal thereof from the film holder 1. The end of the shelf 7b, opposite the end 7c, is provided with an inclined ramp portion 7d, which is directed toward the handle portion 5b of the slide 5. The incline of this ramp 7d is substantially greater than the thickness of the slide 5, permitting the slide 5 to engage said ramp 7d and compress the spring 8, moving the button inwardly until the notch 5c registers with the shelf 7b, whereupon the spring 8 forces the shelf 7b into the notch 5c. It will be noted that the button 7 is provided with shoulders 7g and 7h, which act as stops for the button for holding the ramp 7d in the proper place for reception of the slide 5.

The button portion 7a is provided with an angular ramp portion 7e, which facilitates the removal of the slide 5 at its notch portion 5c from the film holder 1 when the button 7a is depressed inwardly until the shelf 7b is inwardly of the slide 5. Said ramp 7e prevents the end of the notch 5c from catching on the button portion 7a of the locking button 7.

As shown in Fig. 5 of the drawings, the locking button 7 is provided with a bore portion 7f therein, in which the spring 8 is mounted. The opposite end of the spring 8 from the button 7 is supported in a recess 1b in the frame of the photographic film holder 1. Thus, concentric alignment of the spring 8 is maintained, so that no binding action takes place in the reciprocal movement of the button 7.

It should be noted that the frame of film holders to which the invention applies has a transverse ledge 10 on both sides, as indicated in Fig. 2, which cooperates with a complementary groove 11 in the camera body 2, as seen in Fig. 1. In this manner, the side of the film holder facing the camera lens lies flush against the camera body. The purpose of the ledge and groove construction is to lock the film holder so that it cannot be removed without relieving the pressure of the back plate. On the other hand, the back plate 3 of the camera does not have a complementary groove so that it is pressing against the back side of the film holder at a slight angle and engages the transverse ledge 10. This feature of the camera construction is material in connection with the slide locking device of the present invention and, as will be seen, plays a part in its operation.

The operation of my slide locking device for photographic film holders is substantially as follows:

When the photographic film holder 1 is inserted into the camera 2 in front of the resilient back plate 3, the latter forces the holder 1 forwardly in the direction as indicated by the arrow A, causing depression of the locking button 7 against the back plate 3 of the camera 2, which automatically releases the slide 5 by forcing the shelf 7b beyond the inner side of the slide 5. Thus, the shelf 7b, as hereinbefore described, is released from the notch 5c, permitting the slide to be readily and easily removed from exposure of the film.

Thus, the spring-loaded action of the back plate 3 of the camera 2 automatically releases the desired slide by depressing either the locking button 6 or 7, whichever is facing the camera body while the opposite slide remains locked. When the film holder 1 is removed from the camera 2, the respective button facing the camera emerges and locks the slides, as hereinbefore described, by engaging the notch portion therein.

When the film holder is handled in the dark room, the buttons 6 and 7 may be readily depressed for removing the slides and when the slides are inserted, in the film holder, they are automatically locked, which prevents inadvertent removal of the slides and promotes the safety of the film in the film holder 1.

The curved corners 5a of the slide 5, and corresponding curved corners of the slide 4, promote ease of insertion of the slides 4 and 5 past the locking buttons 6 and 7. When the curved end 5a of the slide 5 engages the locking button 7, said curved portion 5a moves smoothly past the button portion 7a without catching thereon. Thus, the curved portions 5a of the slide 5 facilitate insertion of the slide 5 past the locking button 7, and the ramp 7e facilitates removal of the slide at the notch portion 5c, and eliminates any tendency of the slide 5 to catch on the locking button 7.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a photographic film holder of the type comprising a frame and a film covering slide movable in and out of said frame, for use in cameras having a spring-loaded back plate which presses the inserted holder against the camera body, the improvement of locking means for said slide including a button extending from said frame and having a body portion movable inwardly against a spring, a projection on said body portion, a notch in said slide cooperating with said projection for locking said slide, said projection having a ramp adapted to be engaged by the side of said slide for depressing said spring when the slide is inserted in said holder and said body portion having an inclined portion extending inwardly and laterally providing passage for said notch of said slide past said button.

2. In a photographic film holder of the type comprising a frame and a film covering slide movable in and out of said frame, for use in cameras having a spring-loaded back plate which presses the inserted holder against the camera body, the improvement of locking means for said slide including a button extending from said frame and having a body portion movable inwardly against a spring, a projection on said body portion, a notch in said slide cooperating with said projection for locking said slide, said projection having a ramp adapted to be engaged by the side of said slide for depressing said spring when the slide is inserted in said holder and said body portion having an inclined portion extending inwardly and laterally providing passage for said notch of said slide past said button and a side plate affixed to said holder limiting the outward movement of said projection for retaining said projection in said notch, the location of said button in said frame being such that said button is adapted to be depressed against the camera body by the pressure of said back plate when said holder is inserted in the camera, thereby automatically unlocking only the slide of said holder which faces the camera lens.

References Cited in the file of this patent

UNITED STATES PATENTS

| 484,569 | Pierce | Oct. 18, 1892 |
| 2,462,683 | Schwartz et al. | Feb. 22, 1949 |
| 2,576,811 | Schwartz | Nov. 27, 1951 |

FOREIGN PATENTS

| 304,206 | Germany | June 23, 1919 |
| 372,379 | Germany | Mar. 27, 1923 |